Oct. 22, 1929.          J. W. COX          1,732,502
                     ICE CREAM DISHER
                 Original Filed Nov. 12, 1926

Inventor
John W. Cox
By Fred Gerlach
   his Atty.

Patented Oct. 22, 1929

1,732,502

UNITED STATES PATENT OFFICE

JOHN W. COX, OF ERIE, PENNSYLVANIA, ASSIGNOR TO THE GILCHRIST COMPANY, OF NEWARK, NEW JERSEY, A CORPORATION OF NEW JERSEY

ICE-CREAM DISHER

Application filed November 12, 1926, Serial No. 147,869. Renewed January 11, 1929.

The invention relates to ice cream dishers, and its object is to simplify and improve dishers of the electrically heated type exemplified in Patent No. 1,323,523 granted to me December 2, 1919. In the construction set forth in said patent, the resistance element is arranged in a bowl around a hemispherical bowl, and is encased in an outer shell. A desideratum is to provide an ice cream disher in which the bowl is formed of thin metal, so that it will readily penetrate bulk ice-cream in a can, and one object of the invention is to provide an electrically heated disher in which the jacket around the rim and sides of the bowl are dispensed with. Another object of the invention is to provide an electrically heated ice-cream disher which is simple in construction and can be produced at a low cost.

The invention consists in the several novel features hereinafter set forth and more particularly defined by claims at the conclusion hereof.

Figure 1:
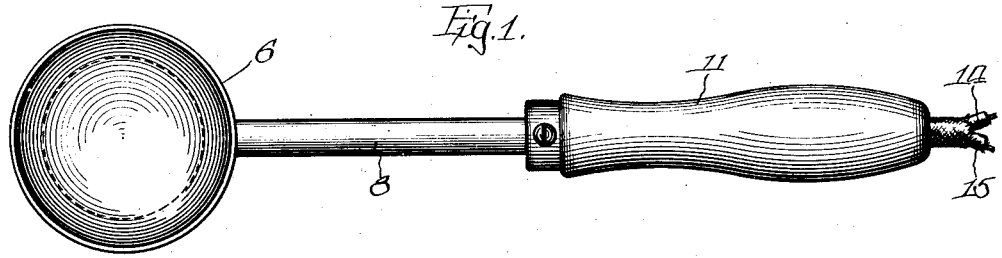
Figure 2:
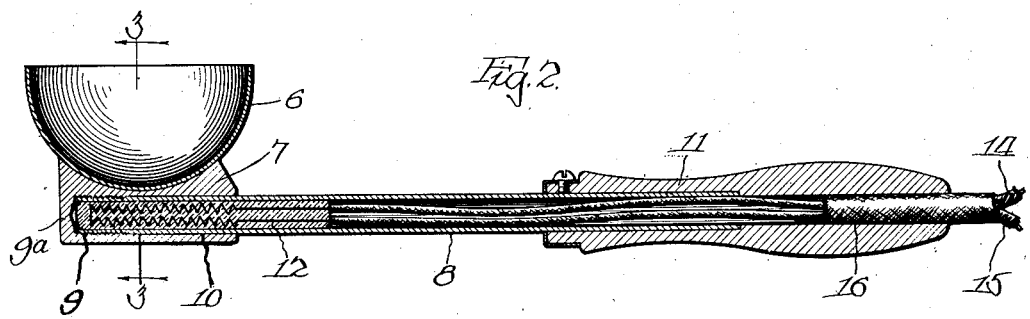
Figure 3:
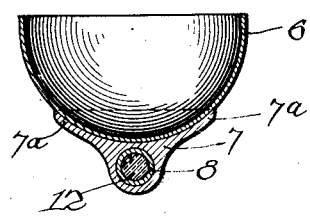

In the drawings: Fig. 1 is a plan of a device embodying the invention. Fig. 2 is a longitudinal section. Fig. 3 is a section on line 3—3 of Fig. 2.

The invention is exemplified in a disher comprising a hemispherical bowl 6, to the bottom of which is united a socket piece or member 7 which, in effect, forms an integral part of the bowl. A cylindrical socket 9 is formed in the member 7 and extends transversely of the axis of the bowl and adjacent to the bottom of the bowl. This socket is closed, as at $9^a$, at one of its ends and is adapted to receive an electrical resistance element 12. Said resistance or heating element 12 is in the form of a coil and is suitably wrapped in any suitable insulating material, such for example as asbestos. This element and its insulation are disposed within one end of a tubular stem 8 which extends into the socket 10. The stem is removably secured in the socket by a screw-thread 9. A handle for manipulating the bowl is secured to the rear end of stem 8.

A characteristic of this construction is that when the stem is disconnected from the member 7 of the bowl, access may be had to the resistance element, thus making it possible to conveniently place the resistance element into operative relation to the bowl. Member 7 is extended laterally from the portion in which the socket 10 is formed, as at $7^a$, to provide heat conducting portions which cover substantially the entire lower portion of the bowl.

Flexible conductors 14 and 15, leading from a suitable source of energy, extend through a longitudinal hole 16 in the handle 11 and are respectively connected to the terminals of the element 12. Any suitable means may be used to control the circuit through the resistance element.

The resistance element heats the portion of the stem in the block 7 adjacent the bottom of the bowl and the heat is transmitted through that portion of the stem and the block 7 to the bowl 6, so that the contents of the bowl may be discharged by inverting it over the receptacle in which it is to be delivered.

The invention exemplifies an electrically heated ice-cream disher, in which the resistance element is contained in a tubular stem which is connected to the bottom of the bowl. The screw-thread 9 permits the stem, with the resistance element therein, to be disconnected from the bowl whenever access to the resistance element for repair or replacement is desired. The construction is one which is simple and can be produced at a low cost.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In an ice-cream disher, the combination of a bowl, means on the bowl, having a socket extending transversely of and adjacent to the bottom of the bowl, a resistance element held in said socket, a handle whereby the bowl may be manipulated, and flexible conductors connected to the resistance element.

2. In an ice-cream disher, the combination of a bowl, a member united to the bottom of the bowl, having a socket closed at one end and extending transversely of and adjacent to the bottom of the bowl, a resistance element held in said socket, a handle whereby the bowl may be manipulated, a tube containing the element, and fitting in said socket, and flexible conductors connected to the resistance element.

3. In an ice-cream disher, the combination of a bowl, means on the bowl having a socket extending transversely of and adjacent to the bottom of the bowl, a tubular stem extending into said socket, a resistance element in the portion of the stem in the socket, a handle secured to the stem, and flexible conductors connected to the resistance element.

4. In an ice-cream disher, the combination of a bowl, means on the bowl having a socket extending transversely of and adjacent to the bottom of the bowl, a tubular stem extending into and removable from said socket, a resistance element in the portion of the stem in said socket, a handle secured to the stem, and flexible conductors connected to the resistance element.

5. In an ice-cream disher, the combination of a bowl, means on the bowl, having a socket extending transversely of and adjacent to the bottom of the bowl, a tubular stem extending into said socket, a resistance element in said stem adjacent said means, a handle secured to the stem and flexible conductors connected to the resistance element and extending through said handle and into said stem.

Signed at Erie, Pennsylvania, this 4th day of November, 1926.

JOHN W. COX.